(12) United States Patent
D'Antuono (10) Patent No.: US 10,960,473 B2
(45) Date of Patent: Mar. 30, 2021

(54) REBAR CUTTING TOOL (71) Applicant: Milwaukee Electric Tool Corporation, Brookfield, WI (US)

(72) Inventor: Marc D'Antuono, Whitefish Bay, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 42 days.

(21) Appl. No.: 16/542,484

(22) Filed: Aug. 16, 2019

(65) Prior Publication Data

US 2020/0061854 A1 Feb. 27, 2020

Related U.S. Application Data (60) Provisional application No. 62/721,101, filed on Aug. 22, 2018.

(51) Int. Cl.
*B23D 35/00* (2006.01)
*B25B 7/12* (2006.01)
*B26B 15/00* (2006.01)
*B23D 17/00* (2006.01)
(Continued)

(52) U.S. Cl.
CPC .......... *B23D 35/008* (2013.01); *B23D 17/00* (2013.01); *B23D 27/00* (2013.01); *B25B 7/12* (2013.01); *B26B 15/00* (2013.01); *B26B 17/00* (2013.01)

(58) Field of Classification Search
CPC .......... B26B 15/00; B26B 17/00; B25B 7/12; B25B 7/00; B25B 7/02; B25B 7/06; B25B 7/08; B23D 35/001; B23D 35/008; B23D 17/00; B23D 21/00; B23D 29/00; B23D 27/00; B23D 27/02; B23D 27/04; B23D 27/06

USPC ............... 30/228, 194, 349, 244, 254, 258; 144/34.5
See application file for complete search history.

(56) References Cited

U.S. PATENT DOCUMENTS 2,885,781 A * 5/1959 Bauer ................... B26B 17/00
30/271
6,146,106 A 11/2000 Suitou et al.
6,214,254 B1 4/2001 Gauthier et al.
(Continued)

FOREIGN PATENT DOCUMENTS

DE 10010601 A1 4/2001
DE 10110882 B3 4/2011
(Continued)

OTHER PUBLICATIONS

New Burndy Patriot In-Line PATMD-LW Series product sheet, 2017.

*Primary Examiner* — Phong H Nguyen
(74) *Attorney, Agent, or Firm* — Quarles & Brady LLP (57) ABSTRACT A cutting head for a power tool. The cutting head includes a first jaw having a first blade mounting surface and a second jaw having a second blade mounting surface. The second jaw is rotatably coupled to the first jaw. The cutting head also includes a first blade removably coupled to the first blade mounting surface of the first jaw and a second blade removably coupled to the second blade mounting surface of the second jaw. A first cutting edge of the first blade is substantially co-planar with a second cutting edge of the second blade. During a cutting action, the first jaw and the second jaw rotate with respect to one another to bring the first cutting edge closer to the second cutting edge.

15 Claims, 6 Drawing Sheets (51) Int. Cl.
  *B26B 17/00* (2006.01)
  *B23D 27/00* (2006.01)

(56) References Cited

U.S. PATENT DOCUMENTS

| | | | |
|---|---|---|---|
| 6,434,998 B2 | 8/2002 | Amherd |
| 6,457,338 B1 | 10/2002 | Frenken |
| 6,739,172 B2 | 5/2004 | Wagner |
| 7,000,448 B2 | 2/2006 | Hamm et al. |
| 7,155,955 B2 | 1/2007 | Bowles et al. |
| 7,191,525 B2 | 3/2007 | Brailovskiy |
| 7,216,523 B2 | 5/2007 | Frenken |
| 7,284,330 B2 | 10/2007 | Wagner |
| 7,363,799 B2 | 4/2008 | Hamm et al. |
| 7,409,846 B2 | 8/2008 | Frenken |
| 7,434,441 B2 | 10/2008 | Frenken |
| 7,634,859 B2 | 12/2009 | Amherd |
| 7,882,722 B2 | 2/2011 | Lefavour et al. |
| 8,336,362 B2 | 12/2012 | Frenken |
| 8,342,001 B2 | 1/2013 | Zhang |
| 8,418,520 B2 | 4/2013 | Stucki et al. |
| 8,578,751 B2 | 11/2013 | Hofmann |
| 8,584,503 B1 | 11/2013 | Steiner et al. |
| 8,671,579 B2 | 3/2014 | Frenken |
| 9,085,024 B2 | 7/2015 | Frenken |
| 9,314,857 B2 | 4/2016 | Chiasson et al. |
| 9,352,429 B2 | 5/2016 | Gottschaldt |
| 9,381,622 B2 | 7/2016 | Wason |
| 9,808,851 B2 | 11/2017 | Thorson et al. |
| 2005/0076513 A1* | 4/2005 | Brailovskiy ......... B23D 29/002 30/250 |
| 2018/0326600 A1 | 11/2018 | Wason et al. |

FOREIGN PATENT DOCUMENTS

DE   102007041644 B4   6/2016
EP       3162457 A1    5/2017

* cited by examiner

REBAR CUTTING TOOL

CROSS REFERENCE TO RELATED APPLICATIONS

The present application claims priority to U.S. provisional application No. 62/721,101 filed Aug. 22, 2018, the contents of which are hereby incorporated by reference in their entirety.

FIELD

The present disclosure relates generally to power tools. More particularly, the present disclosure relates to a cutting power tool.

BACKGROUND

Hydraulic crimpers and cutters are different types of hydraulic power tools for performing work (e.g., crimping or cutting) on a workpiece. In such tools, a hydraulic tool comprising a hydraulic pump is utilized for pressurizing hydraulic fluid and transferring it to a cylinder in the tool. This cylinder causes an extendible piston to be displaced towards a cutting head. The piston exerts a force on the cutting head of the power tool, which may typically include opposed jaws with certain cutting features, depending upon the particular configuration of the power tool. In this case, the force exerted by the piston may be used for closing the jaws to perform cutting on a workpiece (e.g., a wire) at a targeted cutting location.

Certain hydraulic cutting tools and associated cutting heads are known. For example, one known hydraulic cutting tool head utilizes jaws that pivot about a pivoting point axis. Both jaws of such a cutting tool head may have a respective ear through which a pivot pin is placed so that the jaw(s) can pivot about the pivot pin. These ears may interlock, and one or both jaws may have a cutting blade of which a portion rests on that jaw's ear so that, when the jaws are closed, the blades pass by each other. There are certain perceived disadvantages of utilizing a cutting tool head such as this, however. For example, when cutting certain workpieces, particularly those that typically require more force to cut through, the jaws can jam before the workpiece is fully cut through. Further, a cutting action with this cutting tool head can cause the jaws, and thus in turn the blades, to be forced apart. In particular, the cutting force can push each blade against the surface to which the blade is mounted, which causes the blades/jaws to be pushed apart.

Therefore, there is a need for a hydraulic cutting tool that may be used to achieve a full, controllable cut while minimizing or eliminating the force that tends to push the blades apart during a cutting action.

SUMMARY

According to an exemplary arrangement, a cutting head for a power tool is disclosed. The cutting head includes a first jaw including a first blade mounting surface. The cutting head also includes a second jaw including a second blade mounting surface, wherein the second jaw is rotatably coupled to the first jaw. The cutting head also includes a first blade removably coupled to the first blade mounting surface of the first jaw, wherein the first blade includes a first cutting edge opposite the first blade mounting surface. The cutting head also includes a second blade removably coupled to the second blade mounting surface of the second jaw, wherein the second blade includes a second cutting edge opposite the second blade mounting surface, and wherein the first cutting edge of the first blade is substantially co-planar with the second cutting edge of the second blade. During a cutting action, the first jaw and the second jaw rotate with respect to one another to bring the first cutting edge closer to the second cutting edge.

According to a second exemplary arrangement, a power tool is disclosed. The power tool comprises the cutting head of the first exemplary embodiment. The power tool further comprises a moveable piston coupled to the cutting head. The power tool further comprises a motor operable to drive the moveable piston to open and close the first jaw and the second jaw. The power tool further comprises a controller configured to operate the motor.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

By the term "about," "approximately," or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As used herein, "coupled" means associated directly, as well as indirectly. For example, a member A may be directly associated with a member B, or may be indirectly associated therewith, e.g., via another member C. It will be understood that not all relationships among the various disclosed elements are necessarily represented.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one embodiment" or "one example" means that one or more feature, structure, or characteristic described in connection with the example is included in at least one implementation. The phrases "one embodiment" or "one example" in various places in the specification may or may not be referring to the same example.

As used herein, apparatus, element and method "configured to" perform a specified function is indeed capable of performing the specified function without any alteration, rather than merely having potential to perform the specified function after further modification. In other words, the apparatus, element, and method "configured to" perform a specified function is specifically selected, created, implemented, utilized, programmed, and/or designed for the purpose of performing the specified function. As used herein, "configured to" denotes existing characteristics of an apparatus, element, and method which enable the apparatus, element, and method to perform the specified function without further modification. For purposes of this disclosure, an apparatus, element, and method described as being "configured to" perform a particular function may additionally or alternatively be described as being "adapted to" and/or as being "operative to" perform that function.

The limitations of the following claims are not written in means-plus-function format and are not intended to be interpreted based on 35 U.S.C. § 112(f), unless and until such claim limitations expressly use the phrase "means for" followed by a statement of function void of further structure.

Illustrative, non-exhaustive examples, which may or may not be claimed, of the subject matter according the present disclosure are provided below.

Figure 1:
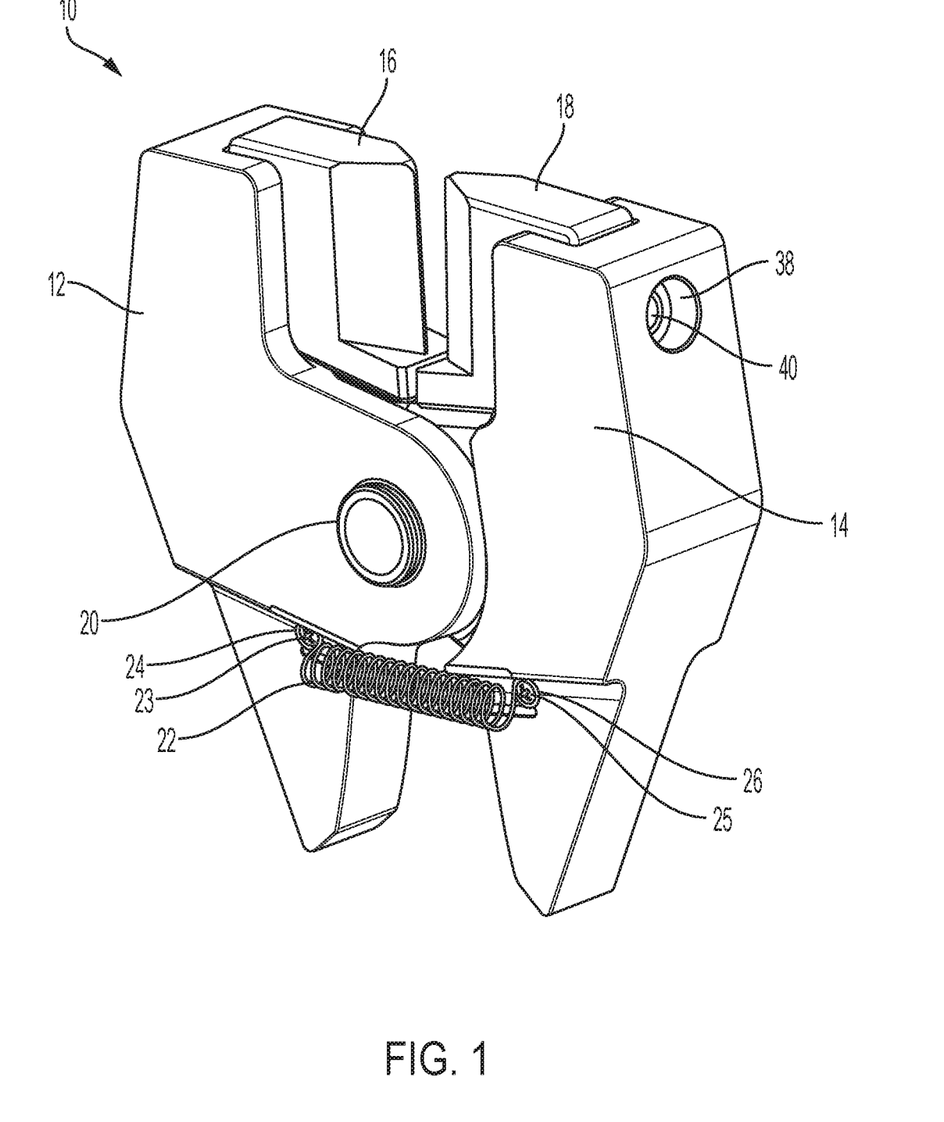
FIG. 1 illustrates a perspective view of a cutting head.

With respect to the Figures, FIG. 1 illustrates a biased open cutting head 10 for a hydraulic power tool. The cutting head 10 comprises jaws including a first jaw 12 and a second jaw 14. The cutting head 10 further comprises a pair of blades. The pair of blades include a first blade 16 that is mounted to the first jaw 12 and a second blade 18 that is mounted to the second jaw 14. The pair of blades 16, 18 are removably mounted to the jaws 12, 14 so that the blades can be replaced, such as after repeated use. The cutting head 10 may further include a pivot pin 20 that defines an axis about which the jaws 12, 14 rotate. In another example, the jaws 12, 14 may be mounted to a tool that has its own pin. In any case, the jaws 12, 14 are configured to rotate with respect to one another. The blades 16, 18 may comprise a different material than the jaws 12, 14. For example, the blades 16, 18 may comprise a harder material (e.g., tool steel) than the jaws 12, 14 in order to withstand the stresses of cutting when in use.

Although not shown in FIG. 1, the cutting head 10 can be part of a hydraulic power tool, as discussed in additional detail below. In one embodiment, the hydraulic power tool can comprise an electric motor, a pump driven by the motor, and a housing defining a cylinder therein. An extendable piston can be disposed within the cylinder. The pump can provide pressurized hydraulic fluid to the piston cylinder, causing the piston to extend from the housing to thereby actuate the jaws 12, 14 of the cutting head 10 for cutting a workpiece, such as a wire. Other power sources can be used to power the tool. Once a workpiece or other target is placed between the jaws 12, 14, the hydraulic power tool can be powered to close the jaws 12, 14 to perform a cutting action and cut the workpiece or other target.

Figure 2:
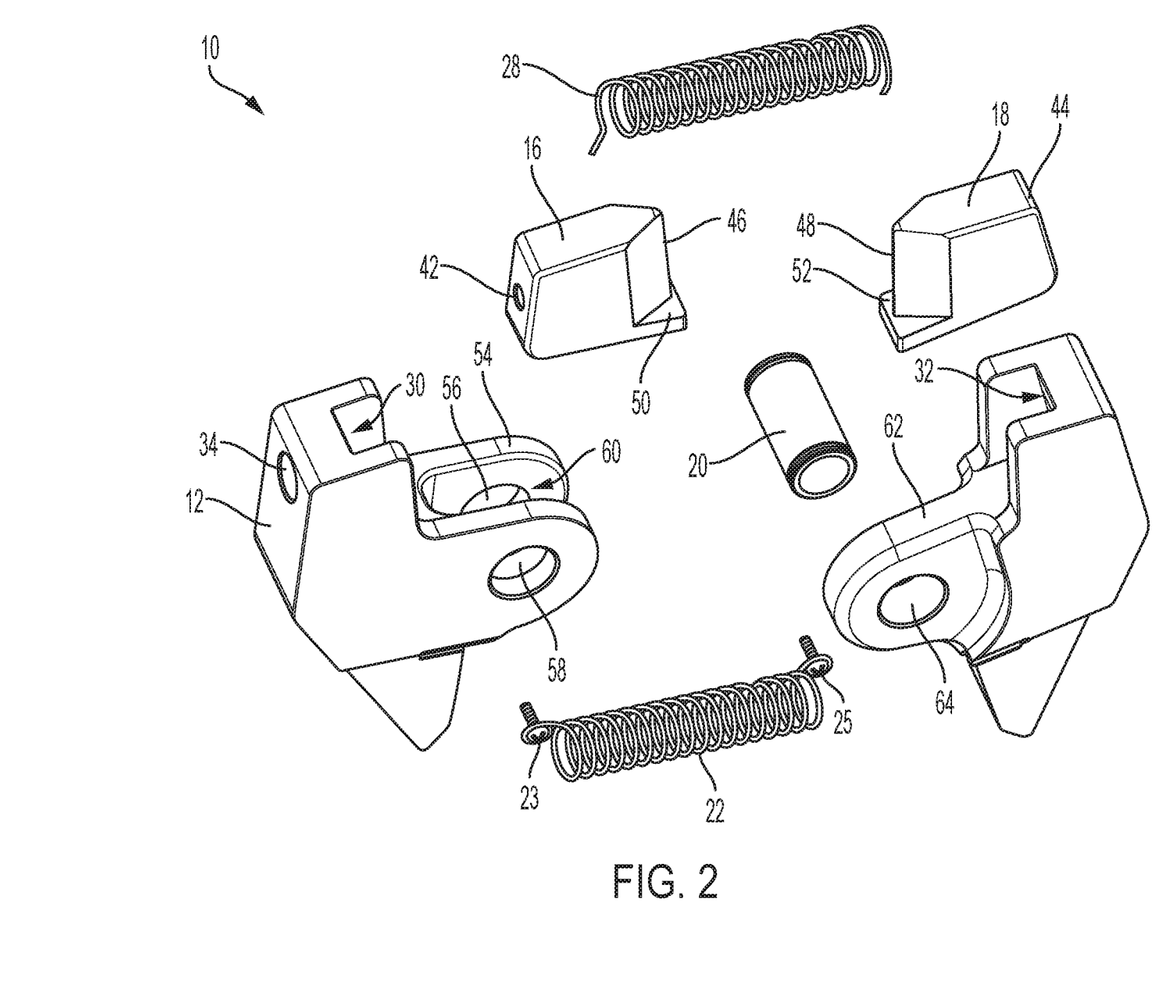
FIG. 2 illustrates an exploded view of the cutting head illustrated in FIG. 1.

FIG. 2 illustrates an exploded view of the various components parts making up the cutting head 10 illustrated in FIG. 1. Shown again are the first jaw 12, the second jaw 14, the first blade 16, the second blade 18, and the pivot pin 20. When the jaws 12, 14 are assembled together, the pivot pin 20 defines an axis for the jaws 12, 14 about which the jaws 12, 14 rotate and enables rotational movement of the jaws 12, 14 about the axis, such as during a cutting action.

Further elements of the cutting head 10 may also include a spring 22 configured to bias the jaws 12, 14 toward an open position. When the component parts of the cutting head 10 are assembled to form the cutting head 10, a first end of the spring 22 is coupled to the first jaw 12 and a second end of the spring 22 is coupled to the second jaw 14. The first jaw 12 may include a first hole 24 configured to receive a first spring mount screw 23, and the second jaw 14 may include a second hole 26 configured to receive a second spring mount screw 24 to thereby secure the spring 22 to the jaws 12, 14. Other types of fastener could be used to mount the spring 22 to the jaws 12, 14. In another example, a second spring 28 is used in addition to the spring 22 to provide additional spring force to bias the jaws 12, 14 toward an open position. The first spring 22 and/or the second spring 28 may comprise an extension spring, as one non-limiting example.

Each jaw has a respective blade mounting surface onto which to mount the blades 16, 18. In particular, as shown in FIG. 2, the first jaw 12 has a first blade mounting surface 30 and the second jaw 14 has a second blade mounting surface 32. Each of the blade mounting surfaces 30, 32 can be substantially planar. As shown in FIG. 2, each of the blade mounting surfaces 30, 32 may comprise a recess in the respective blade having a width slightly greater than the width of the corresponding blades 16, 18. The blading mounting surfaces 30, 32 can have different configurations within other example embodiments of the cutting head 10.

Each jaw also includes a screw bore configured to receive blade mount screws for mounting the blades 16, 18 to the jaws 12, 14. In particular, the first jaw 12 includes a first screw bore 34 configured to receive a first blade mount screw 36, and the second jaw 14 includes a second screw bore 38 configured to receive a second blade mount screw 40. Each of the screw bores 34, 38 can be threaded so as to securely hold the corresponding blade mount screws 36, 40.

The blades 16, 18 each include a screw bore 42, 44 on a side of the blade opposite the side of the blade's cutting edge. The screw bores are used for mounting the blades 16, 18 to the jaws 12, 14. In particular, to mount the first blade 16, the first blade 16 is positioned on the first blade mounting surface 30 and the first blade mount screw 36 is inserted through the screw bore 42 in the first jaw 12, through the first screw bore 34 of the first jaw 12, and then tightened to secure the first blade 16 into place. Likewise, to mount the second blade 18, the second blade 18 is positioned on the second blade mounting surface 32 and the second blade mount screw 40 is inserted through the screw bore 44 in the second jaw 14, through the second screw bore 38 of the second jaw 14, and then tightened to secure the second blade 18 into place. Other types of fasteners and fastener receivers to mount the blades 16, 18 to the jaws 12, 14 can be used within other example embodiments of the cutting head 10.

As shown in FIG. 2, the blades 16, 18 each include a cutting edge opposite the side of the blade including the screw bores 42, 44 and opposite the blade mounting surfaces 30, 32. In particular, the first blade 16 includes a first cutting edge 46 opposite the first blade mounting surface 30, and the second blade 18 includes a second cutting edge 48 opposite the second blade mounting surface 32. The cutting edges 46, 48 may be triangular in shape. Further, the first cutting edge 46 of the first blade 16 may be substantially co-planar with the second cutting edge 48 of the second blade 18 such that the cutting edges 46, 48 are aligned edge to edge when the cutting head 10 is in use.

As further illustrated in FIG. 2, the blades 16, 18 may each include a flange extending from the bottom surface away from the side of the blade including the screw bores 42, 44 and further away from the blade mounting surfaces 30, 32. In particular, the first blade 16 includes a first flange 50 extending away from the first blade mounting surface 30, and the second blade 18 includes a second flange 52 opposite the second blade mounting surface 32. When the blades 16, 18 are installed in the jaws 12, 14, the flanges 50, 52 are positioned closer to each other than the cutting edges 46, 48. As such, when the cutting head 10 is in use, the flanges 50, 52 may contact one another, but the cutting edges 46, 48 do not contact one another. When cutting a workpiece (such as rebar as a non-limiting example), the blades 16, 18 do not need to fully close. Instead, the blades 16, 18 notch the workpiece approximately ¾ of the way through and then pull the workpiece apart in tension. Such an arrangement may help maintain the cutting edges 46, 48 in better condition by avoiding the wear and tear of the cutting edges 46, 48 contacting one another.

As further illustrated in FIG. 2, the jaws 12, 14 each have ears for rotational engagement with each other. The first jaw 12 includes a first ear 54 that includes a first ear bore 56 and a second ear bore 58 for receiving the pivot pin 20. The first ear 54 also includes a slot 60 for receiving a corresponding ear, such as the second ear 62 of the second jaw 14.

The second jaw 14 includes a second ear 62 that includes a third ear bore 64. The third ear bore 64 aligns in between the first ear bore 56 and the second ear bore 58 of the first ear 54 when the second ear 62 is coupled in the slot 60 of the first ear 54. The second ear 62 includes the third ear bore 64 for receiving the pivot pin 20. When the cutting head 10 is assembled, the second ear 62 extends into the slot 60 of the first ear 54 such that they rotationally engage with each other. In another example, the first jaw 12 and the second jaw 14 each include a single ear with a single ear bore. Other example configurations are possible as well.

To bring the jaws 12, 14 together, the bores of the ears are aligned (i.e., the third ear bore 64 is inserted and aligned in between the first ear bore 56 and the second ear bore 58) and the pivot pin 20 is inserted through the bores so that a head of the pivot pin 20 rests against one of the jaws 12, 14. In one example, retaining rings (not shown) are used to secure the pivot pin 20 in place. In another example, the pivot pin 20 could be inserted through the bores so that the head of the pivot pin 20 rests against the second jaw 14. A nut or another fastener component can then be placed around the opposite end of the pivot pin 20 (e.g., the end closer to the first jaw 12) and a set screw can be inserted into a bore of the nut to hold the nut in place around the pivot pin. The nut can include a groove for receiving an end of the set screw when the set screw is screwed into place. The nut thus securely holds the jaws 12, 14 together. Other techniques could be used to securely assemble the jaws 12, 14 together, such as a press-fit (e.g., a press-fit ring), adhesive, jam nut (e.g., with a hollow bolt), or any other suitable technique. In some examples, a nut used to couple around an end of the pivot pin 20 can be a hex nut and the set screw can be a cone point set screw, although other types of nuts and set screws are possible as well.

As discussed herein, in use the blades 16, 18 notch the workpiece approximately ¾ of the way through the workpiece and then pull the workpiece apart in tension. Different blades 16, 18 can be removed and inserted to optimize the distance between the cutting edges 46, 48 of the blades 16, 18. In another example, the blades 16, 18 may include a mechanism that adjusts the distance between the cutting edges 46, 48 so that a single set of blades 16, 18 can be used for workpieces of varying sizes. For example, there may be a mechanism positioned between the blade mounting surfaces 30, 32 and the blades 16, 18 that adjusts the distance between the cutting edges 46, 48. Such a mechanism may comprise a telescoping screw, a rack and pinion, or other mechanism.

Figure 3:
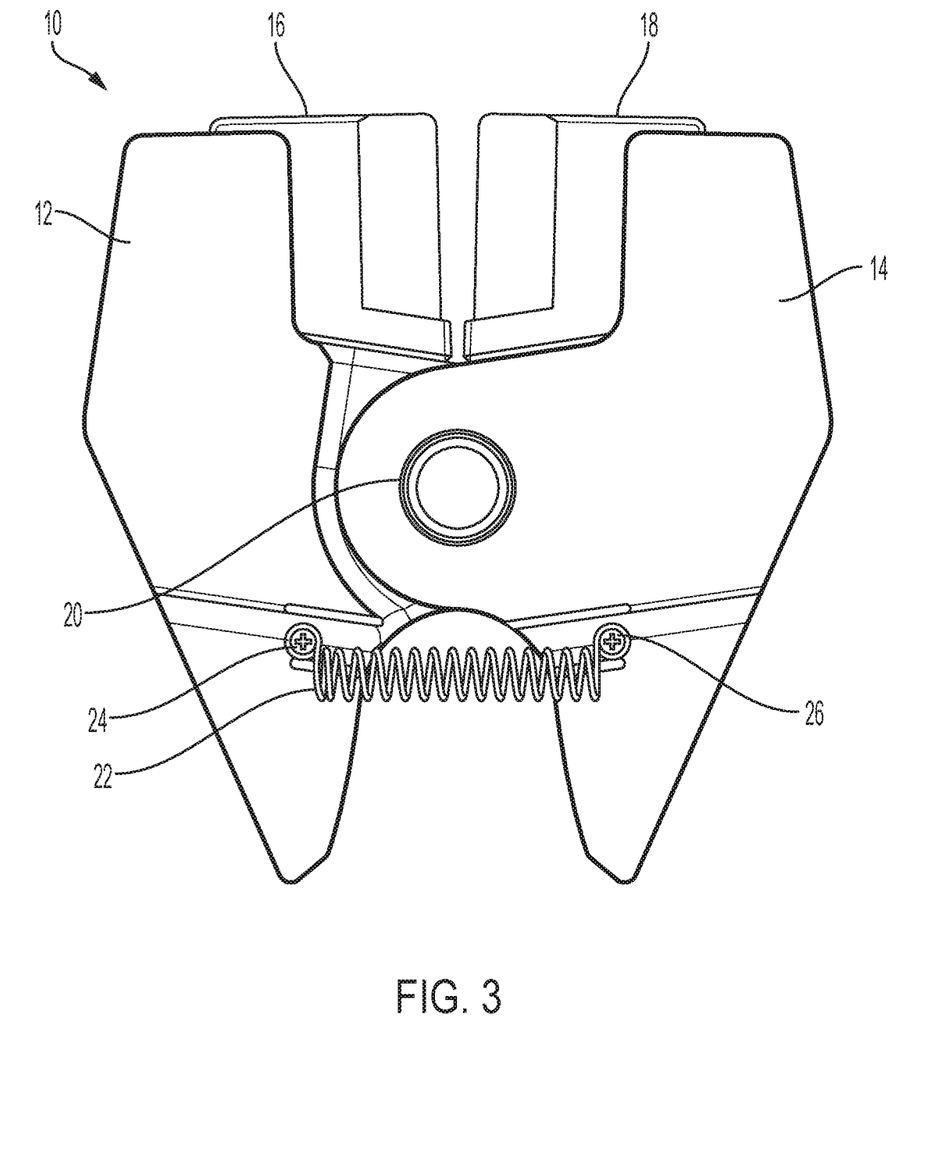
FIG. 3 illustrates a front view of the cutting head illustrated in FIG. 1.
Figure 4:
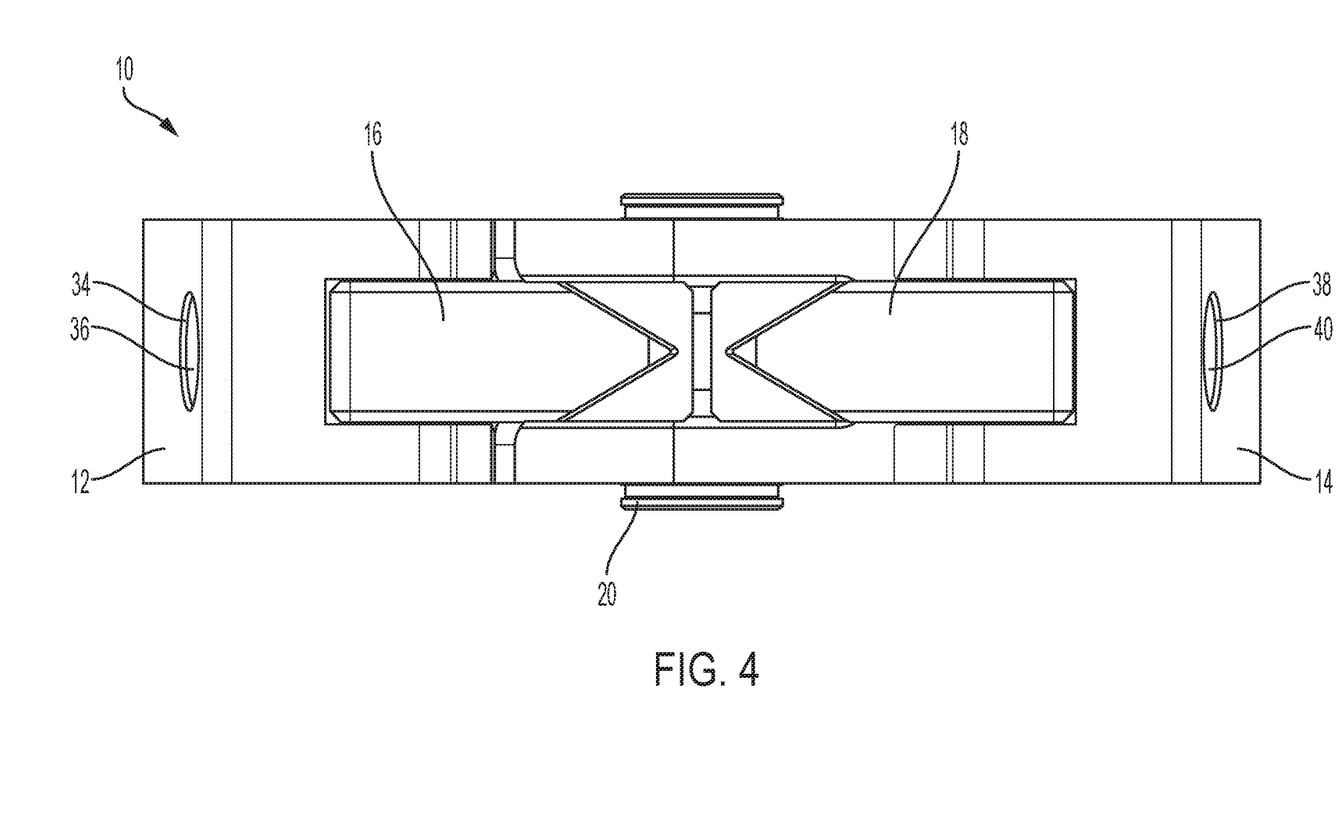
FIG. 4 illustrates a top view of the cutting head illustrated in FIG. 1.
Figure 5:
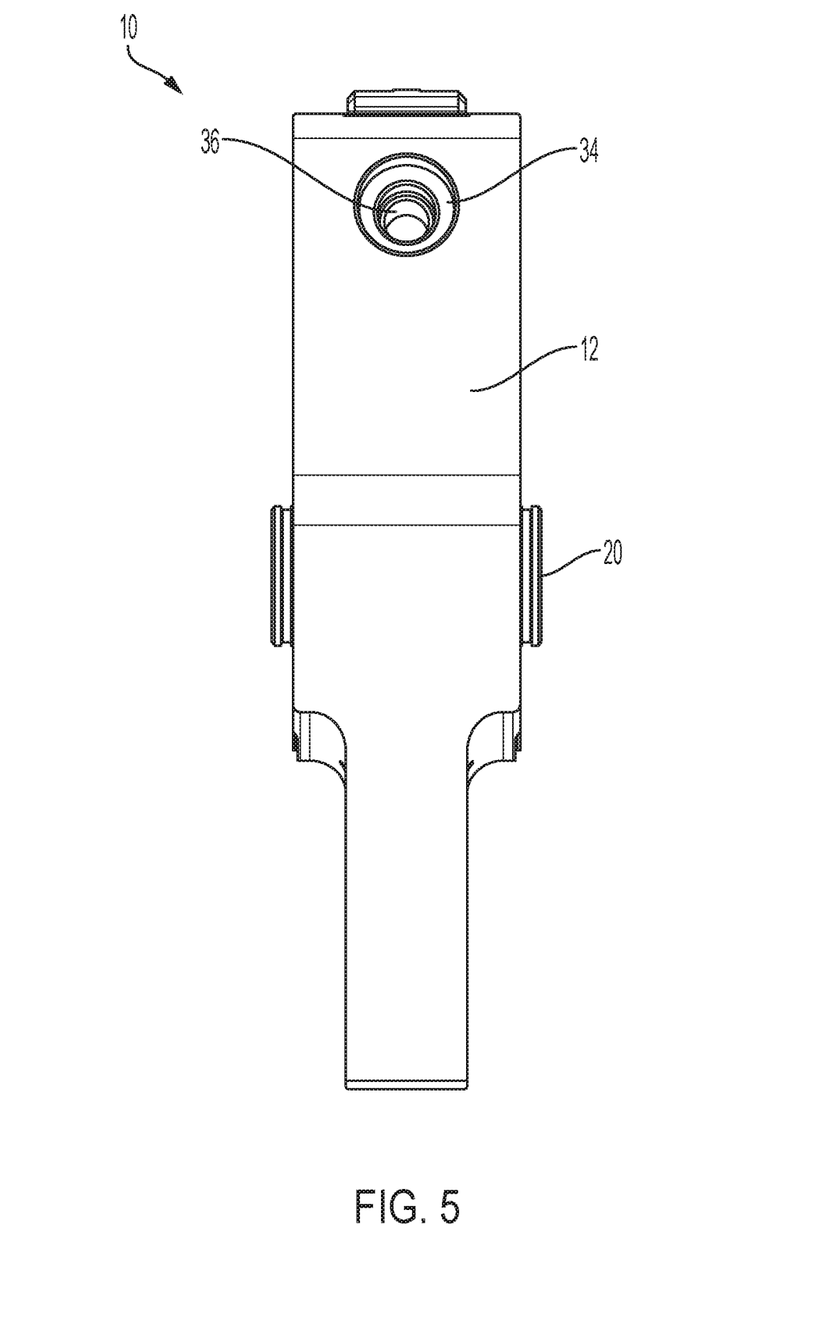
FIG. 5 illustrates a side view of the cutting head illustrated in FIG. 1.

FIG. 3 illustrates a front view of the cutting head 10 illustrated in FIGS. 1-2. FIG. 4 illustrates a top view of the cutting head 10 illustrated in FIGS. 1-3. And FIG. 5 illustrates a side view of the cutting head 10 illustrated in FIGS. 1-4.

Figure 6:
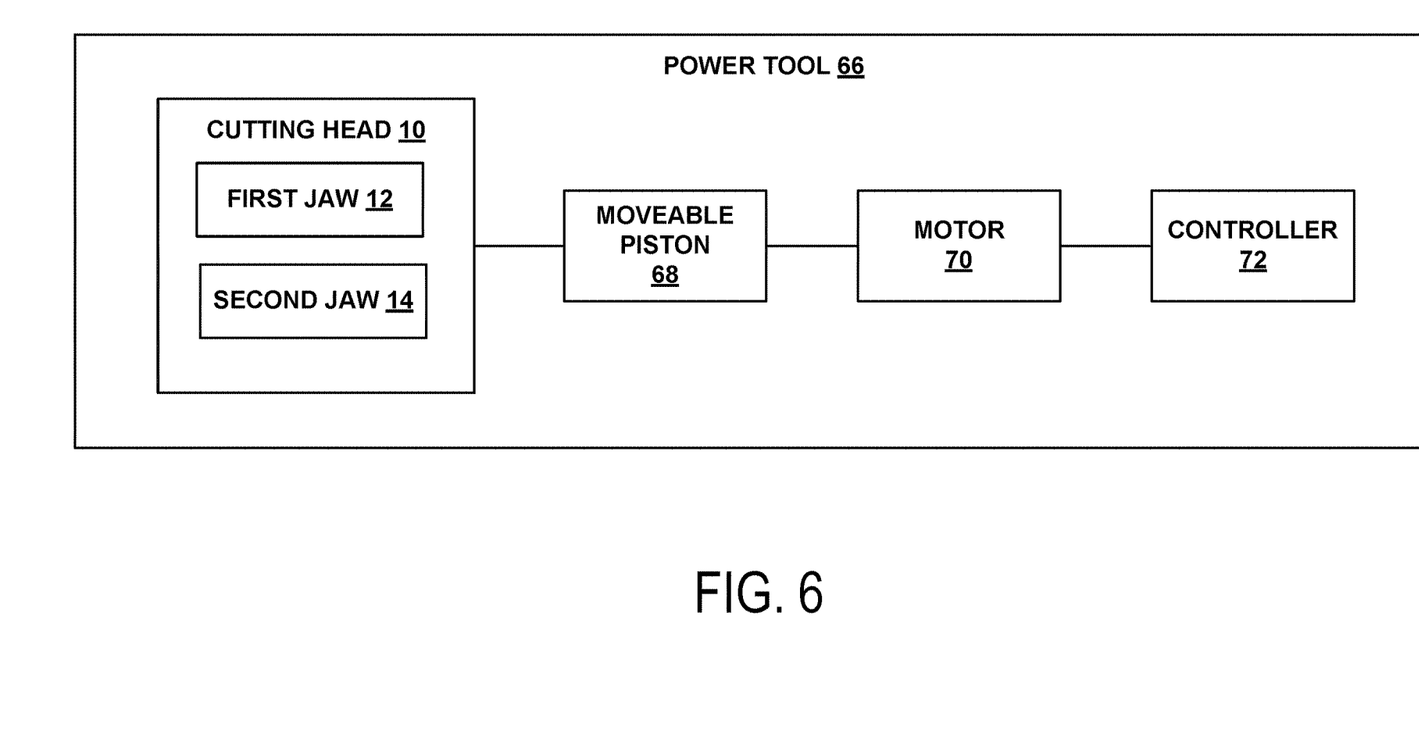
FIG. 6 illustrates a simplified block diagram of a power tool according to an example embodiment.

Finally, FIG. 6 illustrates a simplified block diagram of an example of a power tool 66 that can include the cutting head 10 described above. In addition to the cutting head 10, the power tool 66 includes a moveable piston 68 coupled to the cutting head 10, a motor 70 operable to drive the moveable piston 68 to open and close the jaws 12, 14, and a controller 72 configured to operate the motor 70. The power tool 66 can include and/or omit any of the components described above.

Although not shown, the power tool 66 can, in some embodiments, include a position sensor for indicating to the controller 72 the relative position of the jaws 12, 14. In such embodiments, the controller 72 can determine the relative position of the jaws 12, 14, and thereby determine when to start or stop operation of the motor 70. Once the controller 72 determines that the jaws 12, 14 have completed a cutting action, for instance, the controller 72 can stop operation of the motor 70.

In some embodiments, the power tool 66 can take the form of a hydraulic power tool, in which case the power tool 66 can include additional components not shown in FIG. 6, such as a gear reducer, a pump, a fluid reservoir, and/or a pressure sensor.

Within examples, the jaws 12, 14 of the power tool 66 can open and close to perform work on a workpiece such as cutting the workpiece, as described above. More specifically, the motor 70 can drive the moveable piston 68 to move at least one of the jaws 12, 14 towards another of the jaws 12, 14 to thereby perform a cutting action. The motor 70 can also drive the moveable piston 68 to move at least one of the jaws 12, 14 away from another of the jaws 12, 14 after the cutting action is completed.

The presently disclosed biased open cutting head provides a number of advantages over known hydraulic cutting tools. For example, one advantage of the presently disclosed cutting tool is that the first cutting edge 46 of the first blade 16 is substantially co-planar with the second cutting edge 48 of the second blade 18. Thus, in operation during a cutting action, the cutting edges 46, 48 are aligned edge to edge and do not move past one another. Such a configuration allows for lower force of cutting a workpiece (e.g., a solid rebar rod) than a shear-style cutting jaw. Further, the configuration described herein provides triangular replaceable blades that enable the distance between the cutting edges 46, 48 to be altered to optimize the distance based on the size of the workpiece being cut.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

I claim:

1. A cutting head for a power tool, the cutting head comprising:
   a first jaw including a first blade mounting surface;
   a second jaw including a second blade mounting surface, wherein the second jaw is rotatably coupled to the first jaw;
   a first blade removably coupled to the first blade mounting surface of the first jaw, the first blade including a first flange extending away from the first blade mounting surface, wherein the first blade includes a first cutting edge opposite the first blade mounting surface, the first blade mounting surface including a first bore configured to receive a first blade mount fastener; and
   a second blade removably coupled to the second blade mounting surface of the second jaw, the second blade including a second flange opposite the second blade mounting surface, wherein the second blade includes a second cutting edge opposite the second blade mounting surface, the second blade mounting surface including a second bore configured to receive a second blade mount fastener, and wherein the first cutting edge of the first blade is substantially co-planar with the second cutting edge of the second blade,
   wherein during a cutting action, the first jaw and the second jaw rotate with respect to one another to bring the first cutting edge closer to the second cutting edge, and
   wherein when the first blade is installed in the first jaw and the second blade is installed in the second jaw, a gap exists between the first cutting edge and the second cutting edge when the cutting head is in use.

2. The cutting head of claim 1, further comprising:
   a pivot pin configured to rotatably couple the first jaw to the second jaw, wherein the first jaw is disposed for rotation about an axis defined by the pivot pin, and wherein the second jaw is disposed for rotation about the axis defined by the pivot pin.

3. The cutting head of claim 2, wherein the first jaw further includes a first ear, and wherein the first ear includes a first ear bore, a second ear bore for receiving the pivot pin, and a slot positioned between the first ear bore and the second ear bore, wherein the second jaw further includes a second ear including a third ear bore, and wherein the second ear is positioned in the slot such that the third ear bore aligns with the first ear bore and the second ear bore, and wherein the pivot pin is positioned through each of the first ear bore, the second ear bore, and the third ear bore to thereby rotatably couple the first jaw to the second jaw.

4. The cutting head of claim 1, wherein the first blade is removably coupled to the first blade mounting surface of the first jaw via the first blade mount screw, and wherein the second blade is removably coupled to the second blade mounting surface of the second jaw via the second blade mount screw.

5. The cutting head of claim 1, wherein the first jaw and the second jaw comprise a first material, and wherein the first blade and the second blade comprise a second material that is different than the first material.

6. The cutting head of claim 5, wherein the second material is harder than the first material.

7. The cutting head of claim 6, further comprising:
   a spring coupled to the first jaw and the second jaw to bias the first jaw and the second jaw to an open position.

8. The cutting head of claim 7, wherein the first jaw includes a first hole configured to receive a first spring mount screw, and wherein the second jaw includes a second hole configured to receive a second spring mount screw to thereby secure the spring to the first jaw and the second jaw.

9. The cutting head of claim 6, wherein the first blade mounting surface and the second blade mounting surface are each substantially planar.

10. The cutting head of claim 6, wherein a distance between the first cutting edge and the second cutting edge is adjustable.

11. A power tool comprising:
    a cutting head comprising:
       a first jaw including a first blade mounting surface, the first blade mounting surface including a first bore configured to receive a first blade mount fastener;
       a second jaw including a second blade mounting surface, the second blade mounting surface including a second bore configured to receive a second blade mount fastener, wherein the second jaw is rotatably coupled to the first jaw;
       a first blade removably coupled to the first blade mounting surface of the first jaw, the first blade including a first flange extending away from the first blade mounting surface, and wherein the first blade includes a first cutting edge opposite the first blade mounting surface; and
       a second blade removably coupled to the second blade mounting surface of the second jaw, the second blade including a second flange opposite the second blade mounting surface, wherein the second blade includes a second cutting edge opposite the second blade mounting surface, and wherein the first cutting edge of the first blade is substantially co-planar with the second cutting edge of the second blade; and
    a moveable piston coupled to the cutting head;
    a motor operable to drive the moveable piston to open and close the first jaw and the second jaw; and
    a controller configured to operate the motor,
    wherein during a cutting action, the first jaw and the second jaw rotate with respect to one another to bring the first cutting edge closer to the second cutting edge, and
    wherein when the first blade is installed in the first jaw and the second blade is installed in the second jaw, a gap exists between the first cutting edge and the second cutting edge when the cutting head is in use.

12. The power tool of claim 11, wherein the power tool is a hydraulic cutting tool.

13. The power tool of claim 11, wherein the cutting head further comprises a pivot pin configured to rotatably couple the first jaw to the second jaw, wherein the first jaw is disposed for rotation about an axis defined by the pivot pin, and wherein the second jaw is disposed for rotation about the axis defined by the pivot pin.

14. The power tool of claim 11, wherein the first jaw and the second jaw comprise a first material, wherein the first blade and the second blade comprise a second material that is different than the first material, and wherein the second material is harder than the first material.

15. The power tool of claim 11, wherein a distance between the first cutting edge and the second cutting edge is adjustable.

* * * * *